No. 625,556. Patented May 23, 1899.
J. W. HYATT.
MEANS FOR WASHING GRANULAR FILTER BEDS.
(Application filed Aug. 31, 1898.)
(No Model.)
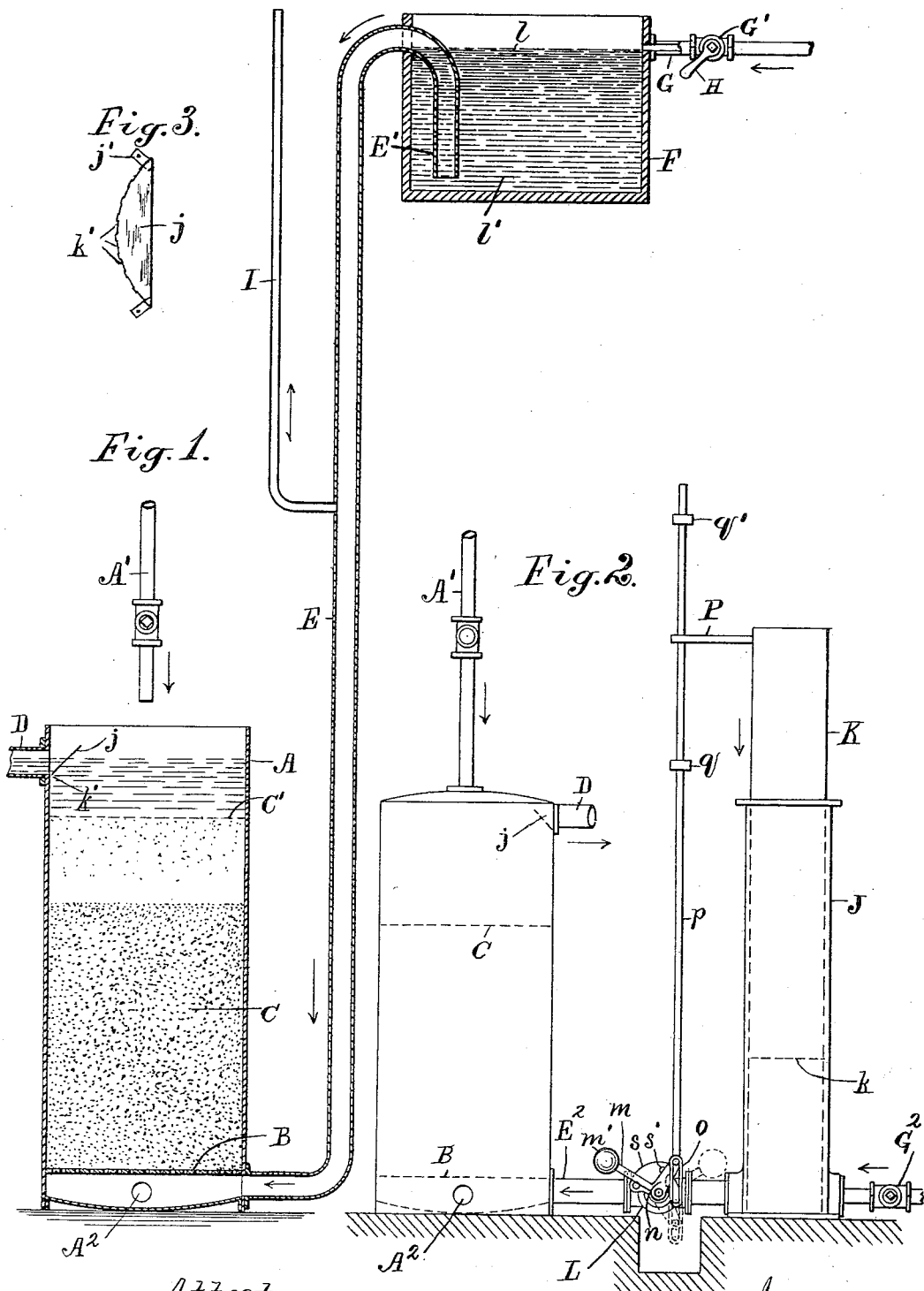
Attest:
W. B. Schaffer
Edw. F. Winsey
Inventor.
John W. Hyatt, per
Thomas S. Crane, Atty.
THE NORRIS PETERS CO., PHOTO-LITHO., WASHINGTON, D. C.

UNITED STATES PATENT OFFICE.

JOHN W. HYATT, OF NEWARK, NEW JERSEY.

MEANS FOR WASHING GRANULAR FILTER-BEDS.

SPECIFICATION forming part of Letters Patent No. 625,556, dated May 23, 1899.

Application filed August 31, 1898. Serial No. 689,948. (No model.)

*To all whom it may concern:*

Be it known that I, JOHN W. HYATT, a citizen of the United States, residing at Newark, county of Essex, State of New Jersey, have invented certain new and useful Improvements in Methods of and Means for Washing Granular Filter-Beds, fully described and represented in the following specification and the accompanying drawings, forming a part of the same.

The present invention relates to that class of filters in which a granular filter-bed is sustained upon a suitable screen or screens adapted to discharge the filtered water which percolates from the bed, and which screens are commonly used for washing the bed by a reverse current. Heretofore it has been found that the current of water which is supplied to the bed for filtration and which is often the entire current available for washing the bed is wholly inadequate to wash the entire bed simultaneously, as its volume is not sufficient when introduced through the screens below the bed to disintegrate the latter and separate the impurities therefrom. Where a larger current is available, it has been found that a sufficient continuous use of such current to cleanse the bed would agitate it too violently, and thus wash away and waste the granular material. Such loss of the granular material cannot usually be controlled or prevented by inspection in a filter having the usual metallic, and therefore opaque, casing, because the contents of the casing are entirely concealed in a closed filter, and in the case of an open filter-bed the mud and silt upon the surface of the bed conceal the level of the sand, so that it is impossible to tell when the sand is lifted to the overflow-pipe. To avoid the washing of the whole filter-bed simultaneously and the consequent loss of the granular material, it has been common to confine the operation of the current to a part only of the filter-bed, whose limited area could be sufficiently agitated without washing away the granular material. In such case sectional screens with several sets of pipes and cocks are needed to introduce the current successively to different sections of the bed, which construction adds very greatly to the cost of the filter. Such sectional washing is not entirely effective, as it does not at any time introduce into the filter-casing a sufficient volume of water to thoroughly agitate the entire bed, and thus insure the loosening of all its particles and their abrasion by one another to wholly cleanse them from the adherent impurities. The advantages of agitating the whole filter-bed simultaneously are so great that I have experimented to discover some method of employing such current without a loss of the granular material and have discovered that the entire filter-bed can be broken up and sufficiently agitated without carrying off the sand by using successive charges of water in sufficient force and volume to lift the bed from its supporting-screen and to drop it again thereon without lifting any of the material to the waste-outlet. When the bed has been thus agitated and broken up by one charge of water, another may be supplied as soon as the bed has settled upon the screen, and such successive charges are intermittingly supplied to the bed in a predetermined volume and at regulated intervals in a continuous washing operation until the entire substance of the bed has been thoroughly agitated and cleansed without lifting any of it above a safe point within the filter-casing. Ten or twelve such charges I find are in practice sufficient to wash a large filter-bed, all of the charges being introduced in such force and volume as to operate upon the whole bed simultaneously and to thus subject all of its material repeatedly to agitation and abrasion. Such successive charges may be intermittingly supplied to the filter-bed in a continuous operation whenever it is deemed necessary by means of a water-tank having a filling pipe and cock adapted to fill the same within the space of time required to operate one of the charges and a siphon connecting such tank with the bottom of the filter-casing, so as to discharge the entire contents of the tank rapidly beneath the filter-bed when the tank is sufficiently filled to start the siphon in operation. Such tank is normally empty; but when a cock or other means for supplying it with water is open the water in the tank rises until the siphon is set in action, the water being supplied to the tank at a slower rate than it can be drawn off by the siphon, so that the tank is intermittingly emptied and the action of the siphon ceases until it is again refilled. The frequency of the intermittent discharges of the tank is of course predetermined by the rate of supply to the tank, and the filter-bed may thus be flooded at intervals which may be easily regulated by controlling the filling-cock, and the mere opening of such cock when it is desired to wash the filter-bed operates to furnish automatically a succession of such washing charges in the required volume and force and at the desired intervals of time. When the bed has been treated by a sufficient number, as ten or twelve, of charges of the washing-water, the washing is concluded by the mere closing of such filling-cock. This method of washing the filter-bed is thus much simpler than any others heretofore employed, as the operation requires the manipulation of only the single cock, which is used for filling the flush-tank and which is merely opened and closed at the beginning and end of the washing operation.

Filters having an open casing have been provided with apparatus for throwing a single charge of washing-water upwardly through the filter-bed when the fouling of the filter-bed prevents the water from flowing through at the normal rate, and the water consequently rises within the casing above the surface of the filter-bed. I have found it undesirable to initiate the washing operation automatically and prefer to have the filter washed at regular intervals by an act of the operator.

I have found with filter-casings filled about two-thirds of their depth, as is usual, that a volume of water equal to one-third the capacity of the filter-casing is sufficient if introduced under suitable pressure (as sixteen to twenty feet head) to disintegrate the filter-bed effectively without lifting it to the top of the casing. The automatic flush-tank may therefore be made of such proportions that the siphon will draw from it at a single charge such a volume of water and by the use of large conducting-pipes will deliver it into the filter-bed with the required force. Instead of using a flush-tank and siphon any other suitable means may be employed for flooding the filter-bed intermittingly with a predetermined volume of water, and such a means is shown, in addition to the flush-tank, in the annexed drawings. The flush-tank is shown in connection with an open filter, while a closed filter is also shown in connection with a cylinder having a loaded plunger which is lifted by the pressure of the water-supply and allowed to fall intermittingly when the communication is opened to the filter-bed. In such latter construction the automatic delivery of the water charges is secured by placing a suitable valve in the wash-water pipe and actuating such valve by the movements of the plunger.

In the drawings, Figure 1 shows the open filter with its tank and siphon in section at the commencement of one of the washing or flooding charges. Fig. 2 is an elevation of a closed filter with the cylinder and plunger for supplying the charges.

In Fig. 1, A designates the filter-casing, open at the top and provided with a false bottom or screen B, which supports the filter-bed C. $A'$ indicates the water-supply used during the filtering operation, and $A^2$ the outlet for filtered water. The filter-casing is provided near the top with waste-outlet D to carry off the washing-water and impurities during the washing operation, and a pipe E is connected with the casing below the screen B and provided at the upper end with a siphon $E'$, which terminates near the bottom of the tank F. The filling-pipe G is shown provided with cock $G'$, having handle H, which is turned to open the cock and gradually fill the tank between the operations of the siphon. When the tank is filled to the level $l$, the water flows into the siphon-pipe and is drawn continuously thereby from the tank until the lower end of the siphon-pipe is exposed and the water is reduced to the level $l'$. So long as the supply of water is continued (during the washing operation) the tank is refilled when the operation of the siphon is suspended and is then reëmptied by the removal of the water faster than it is supplied. When the supply-cock to the tank is closed, the charge of water last supplied to the tank is drained off by the siphon and the tank becomes empty, which is its normal condition until the supply-cock is opened to wash the filter when it again becomes foul. An air-vent pipe I is extended from the side of the siphon-pipe above the top of the filter-casing upwardly above the top of the tank F to vent the air which fills the lower part of the siphon-pipe before the water flows over. Any air which is carried into the filter-bed is useful in agitating the bed and aerating the same; but the accumulation of air in the lower part of the siphon-pipe would prevent the current of water from starting in the siphon and flowing rapidly into the filter-bed, as is desired, or with violent impact, as is desired, or disintegrating the same, as desired. With a suitable regulated volume of water thrown thus violently in successive charges beneath the filter-bed the latter is broken up and violently agitated, so that its particles are rubbed against one another and freed from adhesive impurities, while the substance of the bed is raised only to some predetermined level below the waste-outlet D—as, for instance, to the dotted line $C'$ within the casing.

In Fig. 2 the same operations are shown performed with the closed filter-casing by the vertical cylinder J, having weighted plunger K fitted thereto, and the cock $G^2$, supplying water under suitable pressure to lift the plunger as required. Such cock is opened only during the washing operation, and the lifting of the plunger above a proper limit is prevented by the intermittent opening of a cock L in the pipe $E^2$, which connects the cylinder with the bottom of the filter-casing. The plug of the cock is provided with a segment $s$, having pins $s'$, between which a weighted arm $m$ is arranged to oscillate, so as to open or close the cock when the arm is moved past its central or vertical position. Such movement of the arm is effected by a crank $n$, attached at right angles to the arm and actuated by a slotted link $o$ upon a shifting rod $p$, which is controlled by the plunger K. A tappet-arm P is projected from the plunger to embrace the shifting rod, and adjustable collars $q$ $q'$ are secured upon the shifting rod in suitable positions to be actuated by the plunger at the opposite ends of its stroke. The plunger is represented as having effected one-half of its downward stroke, with its bottom at the dotted line $k$, with the slot in the link $o$ resting upon the crank-pin of the crank $n$, and the collar $q$ is so adjusted that before the plunger reaches the bottom of the stroke it would force such crank downwardly in the position indicated by dotted lines and throw the weighted arm $m$ against the pin $s'$ upon the segment $s$, when the weight $m'$ upon the arm would by its momentum operate to close the valve L and thus permit the refilling of the tank. The rise of the plunger would press the tappet-arm against the collar $q'$ and open the valve L, leaving the parts as indicated by full lines. Such apparatus therefore produces the same effect as the tank and siphon connection, as the only essentials to the practice of my method are the means for supplying the water intermittingly and a washing-pipe connection of suitable size to admit the charge rapidly to the entire bottom of the filter-bed to lift the same from the screen and disintegrate its particles. The intervals between the charges are timed to permit the resettling of the filter-bed, so that its particles when re-agitated by a succeeding charge may not be lifted beyond the desired limit indicated by the dotted line C' in Fig. 1.

Although the siphon is illustrated only in connection with an open filter, it is to be understood that its operation is the same with a closed filter. The siphon-pipe necessarily remains filled with water between the successive charges, with water to the same height as that in the filter-casing, and the air above the same, if not vented from the siphon-pipe, prevents the water-current from starting into the pipe and setting the siphon in operation when the water rises to the level $l$ in the water-tank. The inlet-pipe I may be tapped into the siphon-pipe at any point below the siphon, as a few feet of empty pipe is sufficient to permit the current of water to start automatically over the bend of the siphon.

In practice I provide the interior of the filter, adjacent to the waste-outlet, with a baffle-plate having minute perforations upon a level with the bottom of the said outlet, so that the sand may be prevented from washing away through the outlet if from any accident an excessive charge of washing-water should at any time be supplied to the filter.

The baffle-plate is designated $j$ and is shown provided with bracket-feet $j'$, by which it is secured within the circular filter-casing A, and minute holes $k'$ are formed at the lower edge of the baffle-plate upon a level with the bottom of the waste-outlet. The holes $k'$ are made small enough to permit the escape of water without discharging the granular material. When the filter-bed is unduly agitated or raised by an excessive charge of washing-water, the baffle-plate permits the surplus water to escape over its upper edge, while the sand is screened off by such edge and kept from passing over, while the small holes $k'$ operate to drain the water down as rapidly as possible below the top edge of the baffle-plate, and thus keep the sand from washing over.

The whole device operates as a sort of screen to permit the water to escape without the sand, while it allows the water to pass off (over the top of the baffle-plate) much more rapidly than it could do through a screen.

Long narrow slits may be employed for the perforations $k'$ to increase their area without allowing the sand to escape, which is readily effected by setting the lower edge of the baffle-plate, as shown in Fig. 1, at a very slight distance from the adjacent wall of the filter-casing.

Fig. 3 shows shallow notches $k'$ in the edge of the plate $j$ to form slits when the edge of the plate is set against the wall of the casing, and any other means may be provided to form the small water-outlets along the lower edge of the plate.

From the above description it will be seen that my invention furnishes a means of washing a granular filter-bed in the most effective manner without loss of the granular material and with an enormous reduction of labor involved in the washing operation below that required in washing a large filter by sections, which necessitates the successive opening of large cocks or valves and the careful timing of the periods during which the sections are subjected to the washing-current.

Having thus set forth the invention, what is claimed herein is—

1. In a filter, the combination, with a filter-casing having an inlet-screen at the bottom and a waste-outlet at the top, with a granular filter-bed extended upwardly from the said screen a part only of the way to said outlet, of a supply of washing-water adapted to flush the entire bed simultaneously, and means for automatically and repeatedly, during the washing of the filter, discharging such supply into the bed, and intermittingly suspending such discharge and permitting the settling of the filter-bed upon its support, substantially as set forth.

2. In a filter, the combination, with a filter-casing having an inlet-screen at the bottom and a waste-outlet at the top, with a granular filter-bed arranged between such screen and outlet as set forth, of a normally empty water-tank for containing a charge adapted to flood the entire filter-bed, a supply-pipe to fill such tank gradually, and a siphon connection to automatically discharge the contents of the tank beneath the filter-bed when the tank is first filled and to repeat such discharge intermittingly in a continuous series so long as the supply-pipe to the tank is open.

3. In a filter, the combination, with a filter-casing having an inlet-screen at the bottom and a waste-outlet at the top, with a granular filter-bed extended upwardly from the said screen a part only of the way to said outlet, of a supply of washing-water adapted to flush the entire bed simultaneously, and automatic means for intermittingly and repeatedly discharging such supply into the bed, during the washing operation.

4. In a filter, the combination, with a filter-casing having an inlet-screen at the bottom and a waste-outlet at the top, with a granular filter-bed arranged between such screen and outlet as set forth, of a water-tank with a hand-controlled cock for supplying the same and having a connection with the filter-casing adapted to flood the entire filter-bed, and means operated automatically during the washing operation, to intermittingly and repeatedly connect such tank with the filter-casing and repeatedly flood the entire filter-bed, as and for the purpose set forth.

5. In a filter, the combination, with a filter-casing having an inlet-screen at the bottom and a waste-outlet at the top, with a granular filter-bed arranged between such screen and outlet as set forth, of a water-tank containing charge adapted to flood the entire filter-bed, a supply-pipe to fill such tank gradually, a siphon connection-pipe extended from the top of such tank to the lower side of the filter-bed, and an air-vent pipe tapped into the side of the siphon connection above the top of the filter-casing and extended above the top of the water-tank, as and for the purpose set forth.

6. In a filter, the combination, with a filter-casing having an inlet-screen at the bottom and a waste-outlet at the top with a granular filter-bed arranged between such screen and outlet, as set forth, of an elevated water-tank containing charge adapted to flood the entire filter-bed, a siphon connection to discharge the contents of the tank beneath the filter-bed, and an air-vent pipe extended from the side of such siphon-pipe above the top of the tank to facilitate the automatic flow of the water from the tank through the siphon, substantially as herein set forth.

In testimony whereof I have hereunto set my hand in the presence of two subscribing witnesses.

JOHN W. HYATT.

Witnesses:
FRANK L. MORTON,
THOMAS S. CRANE.